US011195032B2

(12) United States Patent
Okada et al.

(10) Patent No.: US 11,195,032 B2
(45) Date of Patent: Dec. 7, 2021

(54) IMAGE PROCESSING DEVICE AND IMAGE PROCESSING METHOD DETECTING VEHICLE PARKING SPACE

(71) Applicant: DENSO TEN Limited, Kobe (JP)

(72) Inventors: Yasutaka Okada, Kobe (JP); Hiroaki Sano, Kobe (JP); Tetsuo Yamamoto, Kobe (JP); Atsushi Yoshihara, Kobe (JP); Jun Kanetake, Kawasaki (JP); Ryo Yoshimura, Fukuoka (JP); Tomoki Shidori, Kobe (JP)

(73) Assignee: DENSO TEN Limited, Kobe (JP)

( * ) Notice: Subject to any disclaimer, the term of this patent is extended or adjusted under 35 U.S.C. 154(b) by 15 days.

(21) Appl. No.: 16/574,393

(22) Filed: Sep. 18, 2019

(65) Prior Publication Data

US 2020/0193185 A1    Jun. 18, 2020

(30) Foreign Application Priority Data

Dec. 14, 2018  (JP) .............................. JP2018-234803

(51) Int. Cl.
*G06K 9/00*    (2006.01)
*G06T 7/13*    (2017.01)
(Continued)

(52) U.S. Cl.
CPC ........... *G06K 9/00812* (2013.01); *G06K 9/44* (2013.01); *G06K 9/4609* (2013.01); *G06T 7/12* (2017.01);
(Continued)

(58) Field of Classification Search
CPC .... G06K 9/00812; G06K 9/4609; G06K 9/44; G06T 7/12; G06T 7/13; G06T 2207/30256; G06T 2207/30264
See application file for complete search history.

(56) References Cited

U.S. PATENT DOCUMENTS 9,361,529 B2   6/2016  Ryu et al.
9,536,155 B2   1/2017  Takemae
(Continued)

FOREIGN PATENT DOCUMENTS

CN   203318408 U   12/2013
CN   102834309 B   12/2016
(Continued)

OTHER PUBLICATIONS

U.S. Appl. No. 16/574,395, filed Sep. 18, 2019 in the name of Yasutaka Okada et al.
(Continued)

*Primary Examiner* — Siamak Harandi
(74) *Attorney, Agent, or Firm* — Oliff PLC

(57) ABSTRACT

An image processing device includes: a delimiting line detection unit configured to detect a delimiting line candidate based on image data obtained by capturing a surrounding of a vehicle, the delimiting line candidate being a candidate of a delimiting line that delimits a parking space; and an exclusion determination unit configured to determine whether or not to exclude the delimiting line candidate detected by the delimiting line detection unit from the candidate of the delimiting line. In a case where a plurality of the delimiting line candidates is detected within a predetermined range in the image data, the exclusion determination unit determines whether or not to exclude the delimiting line candidate from the candidate of the delimiting line by comparing edge strength of the plurality of delimiting line candidates.

9 Claims, 11 Drawing Sheets

(51) Int. Cl.
  *G06K 9/44* (2006.01)
  *G06K 9/46* (2006.01)
  *G06T 7/12* (2017.01)
(52) U.S. Cl.
  CPC ...... *G06T 7/13* (2017.01); *G06T 2207/30256* (2013.01); *G06T 2207/30264* (2013.01)

(56) References Cited

U.S. PATENT DOCUMENTS

| | | | |
|---|---|---|---|
| 9,721,460 | B2 | 8/2017 | Takemura et al. |
| 10,311,731 | B1 | 6/2019 | Li et al. |
| 10,373,226 | B1 | 8/2019 | Russell et al. |
| 2002/0087253 | A1 | 7/2002 | Jeon |
| 2003/0128106 | A1 | 7/2003 | Ross |
| 2003/0222983 | A1 | 12/2003 | Nobori et al. |
| 2004/0254720 | A1 | 12/2004 | Tanaka et al. |
| 2006/0080035 | A1 | 4/2006 | Daubert et al. |
| 2008/0109120 | A1 | 5/2008 | Sawamoto |
| 2009/0243889 | A1 | 10/2009 | Suhr et al. |
| 2009/0278709 | A1 | 11/2009 | Endo et al. |
| 2010/0049402 | A1 | 2/2010 | Tanaka |
| 2010/0195901 | A1 | 8/2010 | Andrus et al. |
| 2010/0318467 | A1 | 12/2010 | Porter et al. |
| 2011/0006917 | A1 | 1/2011 | Taniguchi et al. |
| 2013/0027557 | A1 | 1/2013 | Hirai et al. |
| 2013/0266188 | A1 | 10/2013 | Bulan et al. |
| 2014/0355822 | A1 | 12/2014 | Choi et al. |
| 2015/0254981 | A1 | 9/2015 | Tachibana et al. |
| 2015/0294163 | A1 | 10/2015 | Sakamoto |
| 2015/0317526 | A1 | 11/2015 | Muramatsu et al. |
| 2015/0344028 | A1 | 12/2015 | Gieseke et al. |
| 2016/0039409 | A1 | 2/2016 | Hayakawa et al. |
| 2016/0093214 | A1 | 3/2016 | Wu et al. |
| 2016/0107689 | A1 | 4/2016 | Lee |
| 2016/0272244 | A1 | 9/2016 | Imai et al. |
| 2016/0304088 | A1 | 10/2016 | Barth |
| 2017/0085790 | A1 | 3/2017 | Bohn |
| 2018/0012082 | A1 | 1/2018 | Satazoda et al. |
| 2018/0095474 | A1* | 4/2018 | Batur ............... G01S 19/48 |
| 2018/0099661 | A1 | 4/2018 | Bae et al. |
| 2018/0162446 | A1 | 6/2018 | Mikuriya et al. |
| 2018/0215413 | A1 | 8/2018 | Inagaki |
| 2018/0307919 | A1 | 10/2018 | Hayakawa |
| 2018/0307922 | A1 | 10/2018 | Yoon et al. |
| 2018/0345955 | A1 | 12/2018 | Kim et al. |
| 2019/0073902 | A1 | 3/2019 | Indoh et al. |
| 2019/0075255 | A1 | 3/2019 | Matsumoto et al. |
| 2019/0094871 | A1 | 3/2019 | Sugano |
| 2019/0370572 | A1* | 12/2019 | Nagpal ............... G06T 7/62 |
| 2020/0062242 | A1 | 2/2020 | Hayakawa |
| 2020/0074192 | A1 | 3/2020 | Ogata et al. |
| 2020/0104613 | A1 | 4/2020 | Hirai |
| 2020/0117927 | A1 | 4/2020 | Oba |
| 2020/0118310 | A1 | 4/2020 | Matsumoto et al. |
| 2020/0175634 | A1 | 6/2020 | Aggarwala et al. |
| 2020/0193643 | A1 | 6/2020 | Hess et al. |
| 2020/0398827 | A1 | 12/2020 | Hara |
| 2021/0180954 | A1 | 6/2021 | Hiyokawa et al. |

FOREIGN PATENT DOCUMENTS

| | | |
|---|---|---|
| JP | 2003-032669 A | 1/2003 |
| JP | 2005-300294 A | 10/2005 |
| JP | 2009-288867 A | 12/2009 |
| JP | 2012-176641 A | 9/2012 |
| JP | 2012-221375 A | 11/2012 |
| JP | 2013-001366 A | 1/2013 |
| JP | 2014-106731 A | 6/2014 |
| JP | 2014-146182 A | 8/2014 |
| JP | 2015-104982 A | 6/2015 |
| JP | 2015-185138 A | 10/2015 |
| JP | 2015219774 A | 12/2015 |
| JP | 2017-021747 A | 1/2017 |
| JP | 2017-076275 A | 4/2017 |
| JP | 2017-087758 A | 5/2017 |
| JP | 2018-136695 A | 8/2018 |
| JP | 2018-180941 A | 11/2018 |
| KR | 20170102192 A | 9/2017 |
| WO | 03058163 A1 | 7/2003 |
| WO | 2005081941 A2 | 9/2005 |
| WO | 2010116922 A1 | 10/2010 |
| WO | 2014/084118 A1 | 6/2014 |
| WO | 2017/068699 A1 | 4/2017 |

OTHER PUBLICATIONS

U.S. Appl. No. 16/574,507, filed Sep. 18, 2019 in the name of Yasutaka Okada et al.
U.S. Appl. No. 16/574,462, filed Sep. 18, 2019 in the name of Yasutaka Okada et al.
U.S. Appl. No. 16/574,422, filed Sep. 18, 2019 in the name of Yasutaka Okada et al.
U.S. Appl. No. 16/574,598, filed Sep. 18, 2019 in the name of Yasutaka Okada et al.
U.S. Appl. No. 16/574,503, filed Sep. 18, 2019 in the name of Yasutaka Okada et al.
U.S. Appl. No. 16/574,499, filed Sep. 18, 2019 in the name of Yasutaka Okada et al.
U.S. Appl. No. 16/574,529, filed Sep. 18, 2019 in the name of Yasutaka Okada et al.
U.S. Appl. No. 16/574,546, filed Sep. 18, 2019 in the name of Yasutaka Okada et al.
U.S. Appl. No. 16/574,391, filed Sep. 18, 2019 in the name of Yasutaka Okada et al.
U.S. Appl. No. 16/574,450, filed Sep. 18, 2019 in the name of Yasutaka Okada et al.
U.S. Appl. No. 16/574,516, filed Sep. 18, 2019 in the name of Yasutaka Okada et al.
Nov. 12, 2020 Notice of Allowance issued in U.S. Appl. No. 16/574,598.
Sep. 29, 2020 Office Action issued in U.S. Appl. No. 16/574,391.
Jun. 30, 2020 Notice of Allowance issued in U.S. Appl. No. 16/574,546.
Aug. 3, 2020 Office Action issued in U.S. Appl. No. 16/574,598.
Reinhard et al., Photographic Tone Reproduction for Digital Images (2002), ACM Transactions on Graphics, 2, 4, 217-236 (Year: 2002).
Feb. 2, 2021 Office Action issued in U.S. Appl. No. 16/574,422.
Suhr et al., "Automatic Parking Space Detection and Tracking for Underground and Indoor Environments." IEEE Transactions on Industrial Electronics. (Year 2016).
K Hamada et al., "Surround View Based Parking Lot Detection and Tracking." IEEE Intelligent Vehicles Symposium. (Year 2015) pp. 1106-1111.
J Suhr et al., "A Universal Vacant Parking Slot Recognition System Using Sensors Mounted on Off-the-Shelf Vehicles." (Year 2018).
Sep. 2, 2020 Corrected Notice of Allowability issued in U.S. Appl. No. 16/574,546.
Nov. 23, 2020 Office Action Issued in U.S. Appl. No. 16/574,462.
K Choeychuen, "Available car parking space detection from webcam by using adaptive mixing features," 2012 Ninth International Joint Conference on Computer Science and Software Engineering (JCSSE) (Year: 2012).
Nov. 30, 2020 Office Action issued in U.S. Appl. No. 16/574,503.
May 19, 2021 Office Action issued in U.S. Appl. No. 16/574,395.
May 12, 2021 Notice of Allowance issued in U.S. Appl. No. 16/574,422.
Mar. 19, 2021 Office Action issued in U.S. Appl. No. 16/574,462.
Mar. 19, 2021 Office Action issued in U.S. Appl. No. 16/574,503.
Mar. 25, 2021 Office Action issued in U.S. Appl. No. 16/574,391.
Mar. 30, 2021 Office Action issued in U.S. Appl. No. 16/574,516.
Apr. 6, 2021 Office Action issued in U.S. Appl. No. 16/574,507.
Jul. 20, 2021 Notice of Allowance issued in U.S. Appl. No. 16/574,507.

* cited by examiner

| | | ATTENTION DELIMITING LINE CANDIDATE | |
|---|---|---|---|
| | | STRONG EDGE STRENGTH | WEAK EDGE STRENGTH |
| ADJACENT DELIMITING LINE CANDIDATE | STRONG EDGE STRENGTH | KEEP | EXCLUDE ATTENTION DELIMITING LINE CANDIDATE |
| | WEAK EDGE STRENGTH | EXCLUDE ADJACENT DELIMITING LINE CANDIDATE | KEEP |

IMAGE PROCESSING DEVICE AND IMAGE PROCESSING METHOD DETECTING VEHICLE PARKING SPACE

CROSS-REFERENCE TO RELATED APPLICATIONS

This application is based upon and claims the benefit of priority from prior Japanese patent application No. 2018-234803, filed on Dec. 14, 2018, the entire contents of which are incorporated herein by reference.

BACKGROUND

Technical Field

The present disclosure relates to an image processing device and an image processing method.

Related Art

In recent years, as automatic driving technology is developed, an image processing device configured to detect a parking space for parking a vehicle from image data obtained by capturing a surrounding of the vehicle is spread. In the image processing device, delimiting lines for delimiting the parking space are detected from the captured data, and the parking space is detected on the basis of the detected delimiting lines (for example, see JP-A-2017-87758).

SUMMARY

In a case where an unnecessary delimiting line is not sufficiently erased from a road surface, the unnecessary delimiting line that has been forgotten to erase may be falsely detected as the delimiting line. Thereby, the parking space may not be normally detected.

Aspect of non-limiting embodiments of the present disclosure relates to provide an image processing device and an image processing method capable of improving detection accuracy of a delimiting line.

According to an aspect of the present disclosure, there is provided an image processing device including: a delimiting line detection unit configured to detect a delimiting line candidate based on image data obtained by capturing a surrounding of a vehicle, the delimiting line candidate being a candidate of a delimiting line that delimits a parking space; and an exclusion determination unit configured to determine whether or not to exclude the delimiting line candidate detected by the delimiting line detection unit from the candidate of the delimiting line, wherein, in a case where a plurality of the delimiting line candidates is detected within a predetermined range in the image data, the exclusion determination unit determines whether or not to exclude the delimiting line candidate from the candidate of the delimiting line by comparing edge strength of the plurality of delimiting line candidates.

According to the present disclosure, it may be possible to improve detection accuracy of the delimiting line.

BRIEF DESCRIPTION OF DRAWINGS

Exemplary embodiment(s) of the present invention will be described in detail based on the following figures, wherein.

DETAILED DESCRIPTION

Hereinbelow, an exemplary embodiment of the image processing device and the image processing method of the present disclosure will be described in detail with reference to the accompanying drawings. In the meantime, the present disclosure is not limited to the exemplary embodiment.

<Outline of Image Processing Device>

Figure 1A:
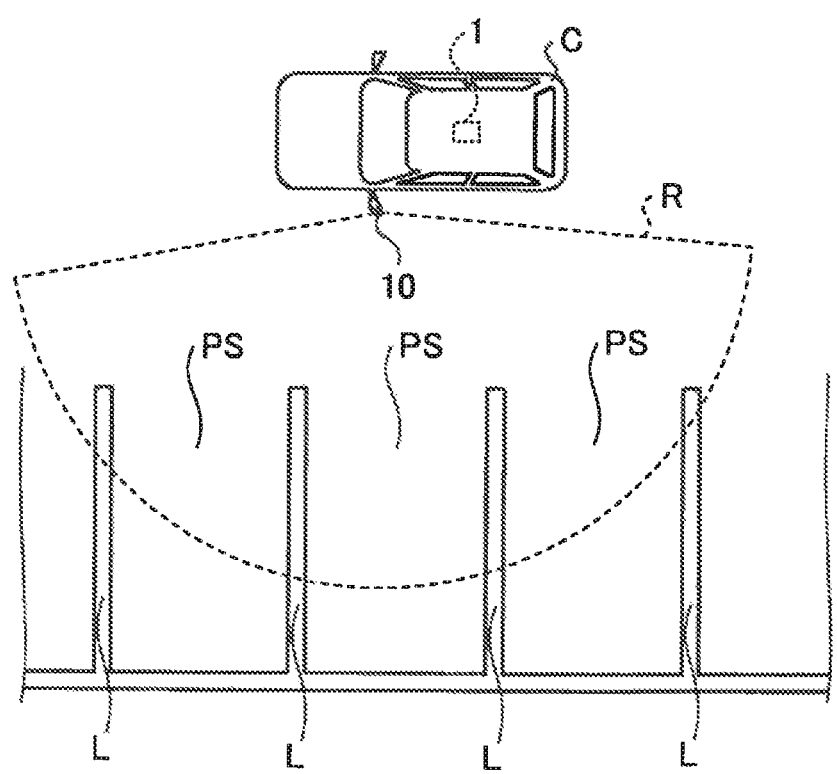
FIG. 1A depicts an example in which an image processing device according to an exemplary embodiment is mounted.
Figure 1B:
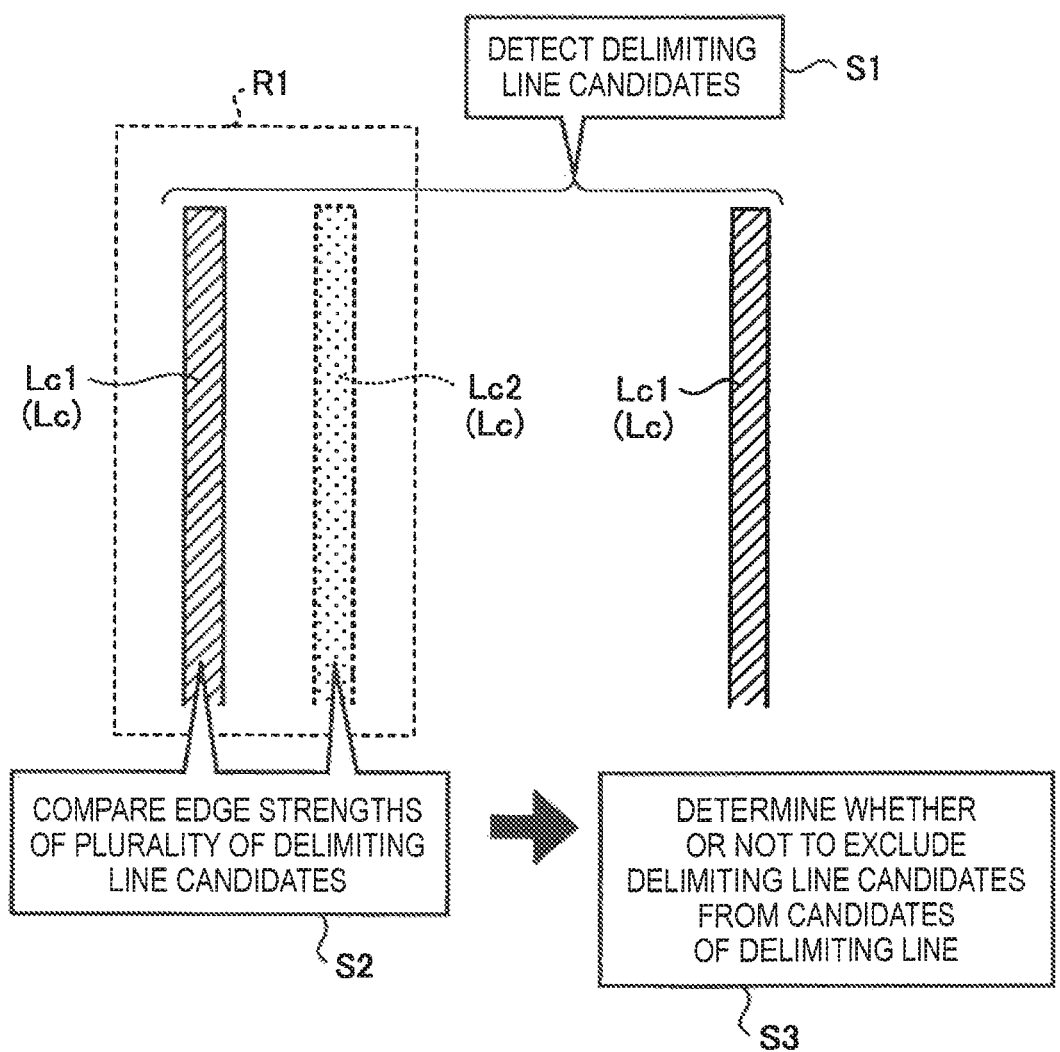
FIG. 1B depicts an outline of an image processing method according to the exemplary embodiment.

First, an outline of an image processing device according to an exemplary embodiment is described with reference to FIGS. 1A and 1B. FIG. 1A depicts an example in which an image processing device 1 is mounted. Also, FIG. 1B depicts an outline of an image processing method of the exemplary embodiment. The image processing method is executed by the image processing device 1 shown in FIG. 2.

As shown in FIG. 1A, the image processing device 1 according to the exemplary embodiment is mounted on a vehicle C, and is configured to detect delimiting lines L from captured data captured by a vehicle-mounted camera 10 and to detect parking spaces PS from the delimiting lines L.

The vehicle-mounted camera 10 includes an imaging element such as a CCD (Charge Coupled Device), a CMOS (Complementary Metal Oxide Semiconductor) and the like, for example, and is configured to capture a surrounding of the vehicle C. Also, a lens of the vehicle-mounted camera 10, for which a wide-angle lens such as a fish-eye lens is adopted, for example, has an imaging area R as shown in FIG. 1A.

Meanwhile, in the example of FIG. 1A, the vehicle-mounted camera 10 is a left side camera configured to capture a left side of the vehicle C. However, the vehicle-mounted camera 10 includes a front camera configured to capture a front of the vehicle C, a rear camera configured to capture a rear of the vehicle C, a right side camera configured to capture a right side of the vehicle C, and the like.

When detecting the parking spaces PS, the image processing device 1 detects delimiting line candidates Lc (refer to FIG. 1B), which are candidates of the delimiting line L for delimiting each parking space PS, and detects the parking spaces PS on the basis of the detected delimiting line candidates Lc.

However, for example, when an unnecessary delimiting line L has not been sufficiently erased from a road surface, the unnecessary delimiting line L, which has been forgotten to erase, may be falsely detected as the delimiting line candidate Lc. Thereby, the parking space PS may not be normally detected.

Therefore, the image processing device 1 of the exemplary embodiment is configured to exclude the delimiting line candidate Lc, which is falsely detected as the delimiting line L, from the candidates of the delimiting line L by predetermined processing. Thereby, the image processing device 1 of the exemplary embodiment can improve detection accuracy of the delimiting line L.

Specifically, as shown in FIG. 1B, the image processing device 1 detects first the delimiting line candidates Lc from the captured data (step S1). For example, the image processing device 1 detects the delimiting line candidates Lc, based on edge lines connecting edge points obtained by performing edge emphasizing for the captured data.

In the following drawings, for easy understanding, the descriptions are made on the basis of the drawings obtained by converting the captured data into bird's eye views. Also, in the following drawings, the delimiting line candidate Lc based on the actual delimiting line L is shown as a delimiting line candidate Lc1 by the solid line, and the delimiting line candidate Lc based on the unnecessary delimiting line L, which has been forgotten to erase, is shown as a delimiting line candidate Lc2 by the broken line.

In step S1, both the delimiting line candidate Lc1 and the delimiting line candidate Lc2 are detected as the delimiting line candidates Lc. Meanwhile, FIG. 1B shows an example in which the delimiting line L is a single line.

Then, as shown in FIG. 1B, when a plurality of delimiting line candidates Lc is detected within a predetermined range R1 in the image data (i.e., within a predetermined range of a parking lot), the image processing device 1 compares edge strength of the plurality of detected delimiting line candidates Lc (step S2).

For example, since the delimiting line candidate Lc2 based on the unnecessary delimiting line L, which has been forgotten to erase, is generally in a state in which it is old and rubbed off, a difference in luminance from the road surface is small, so that an edge line thereof is detected with a weak edge strength.

Also, since the delimiting line candidate Lc1 based on the delimiting line L, which has been newly drawn again, is generally in a new state, a difference in luminance from the road surface is large, so that an edge line thereof is detected with a strong edge strength.

Meanwhile, in the present disclosure, an edge strength of an edge line obtained by performing edge emphasizing is regarded as an edge strength of the delimiting line candidate Lc detected on the basis of such edge line. Also, the delimiting line candidate Lc detected with an edge line having a weak (or strong) edge strength is referred to as "delimiting line candidate Lc having a weak (or strong) edge strength".

Also, the predetermined range R1 is wider than a range in which one delimiting line L is to be detected, and is narrower than a range in which one parking space PS is included, for example. For example, the predetermined range R1 is set to a range in which a plurality of adjacent (for example, 2 or 3) delimiting lines L is to be detected.

The image processing device 1 determines whether or not to exclude the plurality of delimiting line candidates Lc from the candidates of the delimiting line L by comparing the edge strength of the plurality of delimiting line candidates Lc detected within the predetermined range R1 (step S3). For example, when a difference of the edge strength of the plurality of delimiting line candidates Lc is equal to or greater than a predetermined value, the image processing device 1 determines that the delimiting line candidate Lc having a weaker edge strength is an unnecessary delimiting line, which has been forgotten to erase, and excludes the same from the candidates of the delimiting line L.

In the example of FIG. 1B, when the difference of the edge strength of the delimiting line candidate Lc1 having a stronger edge strength and the delimiting line candidate Lc2 having a weaker edge strength is equal to or greater than the predetermined value, the image processing device 1 may exclude the delimiting line candidate Lc2 having a weaker edge strength from the candidates of the delimiting line L.

Thereby, the image processing device 1 can exclude the delimiting line candidate Lc2 based on the unnecessary delimiting line L, which has been forgotten to erase, from the delimiting line candidates Lc. Therefore, according to the exemplary embodiment, it may be possible to improve detection accuracy of the delimiting line L.

<Configuration Example of Image Processing Device>

Figure 2:
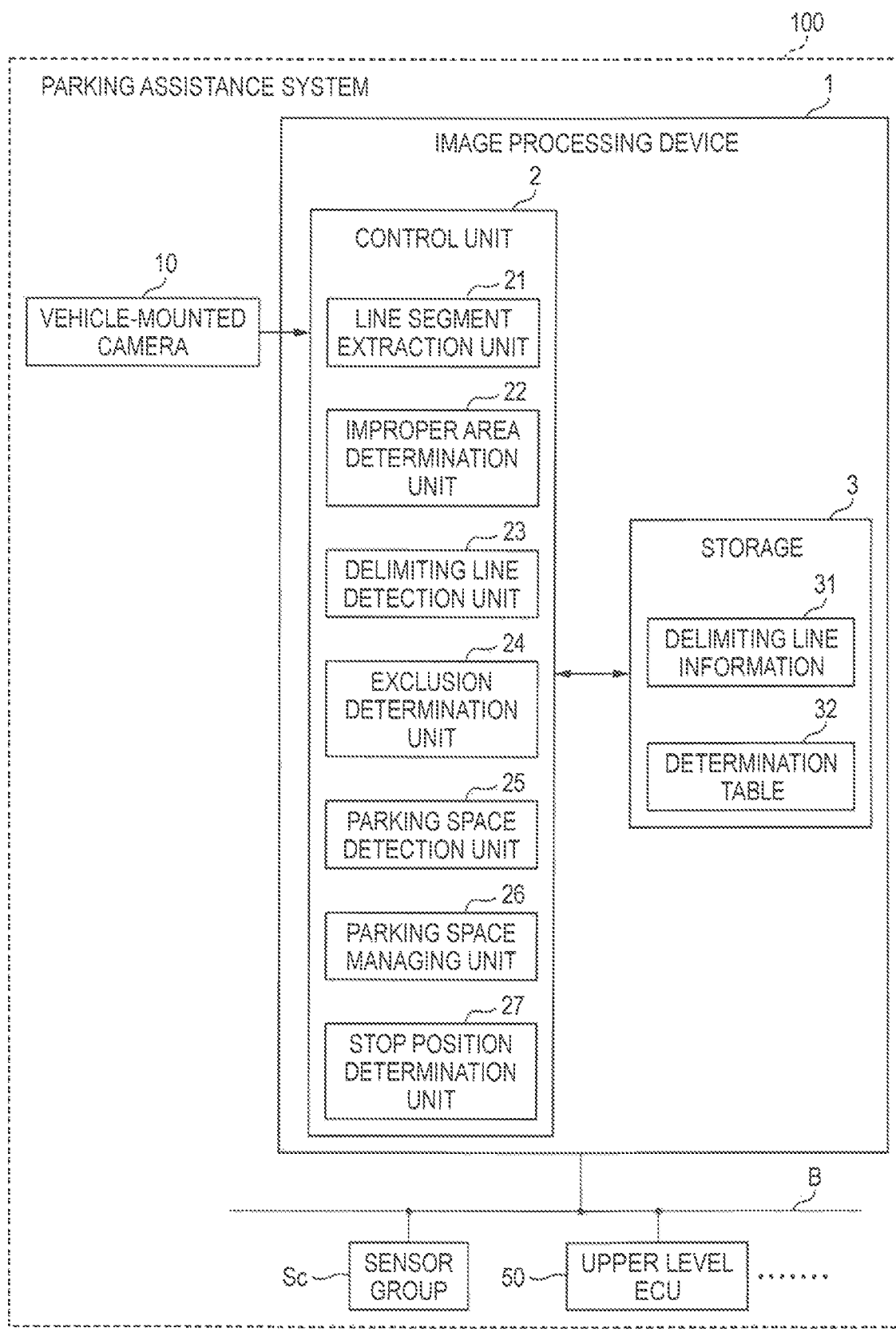
FIG. 2 is a block diagram depicting a configuration of a parking assistance system according to the exemplary embodiment.

Subsequently, a configuration example of the image processing device 1 according to the exemplary embodiment is described with reference to FIG. 2. FIG. 2 is a block diagram of the image processing device 1. In the meantime, FIG. 2 depicts a parking assistance system 100 including the image processing device 1.

As shown in FIG. 2, the parking assistance system 100 includes the image processing device 1, the vehicle-mounted camera 10, a sensor group Sc, and an upper level ECU (Electronic Control Unit) 50. Also, as shown in FIG. 2, the image processing device 1, the sensor group Sc and the upper level ECU 50 can perform communication with one another via a communication bus B of communication protocols of CAN (Control Area Network) communication.

The sensor group Sc includes a variety of sensors configured to detect a traveling state of the vehicle C (refer to FIG. 1A), and is configured to notify detected sensor values to the image processing device 1. The sensor group Sc includes a vehicle speed sensor configured to detect the number of rotations of a wheel of the vehicle C, a steering angle sensor configured to detect a steering angle of the vehicle C, and the like.

The upper level ECU 50 is an ECU configured to support automatic parking of the vehicle C, for example, and is configured to control such that the vehicle C is parked in the parking space PS, based on the parking space PS detected by the image processing device 1, for example.

For example, the upper level ECU 50 is an EPS (Electric Power Steering)-ECU configured to control the steering angle of the vehicle C, and can control the steering angle relative to the parking space PS detected by the image processing device 1. In the meantime, the upper level ECU 50 may include an ECU configured to perform accelerator control and brake control.

As shown in FIG. 2, the image processing device 1 includes a control unit 2 and a storage 3. The control unit 2 includes a line segment extraction unit 21, an improper area determination unit 22, a delimiting line detection unit 23, an exclusion determination unit 24, a parking space detection unit 25, a parking space managing unit 26, and a stop position determination unit 27. The storage 3 has delimiting line information 31 and a determination table 32.

The control unit 2 includes a computer having, for example, a CPU (Central Processing Unit), a ROM (Read Only Memory), a RAM (Random Access Memory), an HDD (Hard Disk Drive), an I/O port, and the like, and a variety of circuits.

The CPU of the computer is configured to read and execute programs stored in the ROM, thereby functioning as the line segment extraction unit 21, the improper area determination unit 22, the delimiting line detection unit 23, the exclusion determination unit 24, the parking space detection unit 25, the parking space managing unit 26 and the stop position determination unit 27 of the control unit 2.

Also, at least some or all of the line segment extraction unit 21, the improper area determination unit 22, the delimiting line detection unit 23, the exclusion determination unit 24, the parking space detection unit 25, the parking space managing unit 26 and the stop position determination unit 27 of the control unit 2 may be configured by hardware such as an ASIC (Application Specific Integrated Circuit), an FPGA (Field Programmable Gate Array) and the like.

When it is assumed that the vehicle C travels in the parking lot (for example, the vehicle speed is lower than 30 km/h), for example, the control unit 2 may execute detection processing of the parking space PS, which will be described later, or may execute the detection processing all during the traveling of the vehicle C.

The line segment extraction unit 21 is configured to detect edge lines connecting edge points based on luminance of each pixel, from the image data input from the vehicle-mounted camera 10. Specifically, the line segment extraction unit 21 converts the image data input from the vehicle-mounted camera 10 into a gray scale image by performing gray scaling for the image data. The gray scaling is processing of converting each pixel of image data so as to express the same with each gradation (for example, 256 gradations) from white to black, in correspondence to luminance.

The line segment extraction unit 21 may obtain an edge strength of each pixel and a luminance gradient by applying a Sobel filter to the gray scale image, for example. Then, the line segment extraction unit 21 may extract the edge points by extracting pixels having edge strength exceeding a predetermined value, and may extract the edge lines by connecting the adjacent edge points. The line segment extraction unit 21 is configured to notify edge information about the extracted edge points and edge lines to the improper area determination unit 22.

The improper area determination unit 22 is configured to determine whether there is an improper area in which it is difficult to detect the delimiting line L for establishing the parking space PS, based on the edge points and edge lines extracted by the line segment extraction unit 21. For example, the improper area determination unit 22 may determine, as the improper area, a non-paved road surface area (for example, gravels) and a grating area, in which more edge points are extracted, as compared to a paved road surface.

Specifically, the improper area determination unit 22 may determine, as the improper area, an area in which a density of the respective edge points is equal to or greater than a predetermined value and the luminance gradient of the respective edge points is not uniform. The improper area determination unit 22 is configured to remove edge information about the improper area from the edge information, based on the determined improper area, and to provide the resultant information to later processing.

The delimiting line detection unit 23 is configured to detect the delimiting line candidate Lc, which is a candidate of the delimiting line L for delimiting the parking space PS, based on the edge lines extracted by the line segment extraction unit 21. Specifically, the delimiting line detection unit 23 detects, as the delimiting line candidate Lc, a rectangular area of which edge lines substantially parallel with each other and having an interval belonging to a predetermined range corresponding to a width of the delimiting line L are set as two sides. In other words, the delimiting line detection unit 23 detects, as the delimiting line candidate Lc, a rectangular area of which a pair of edge lines corresponding to a boundary between an actual delimiting line and a road surface is set as two sides. Here, the expression "substantially parallel with each other" means that edge lines are parallel with each other with a variation of about 2°.

Figures 3, 4:
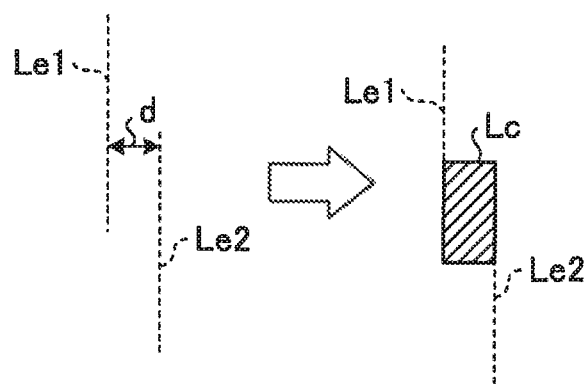
FIG. 3 depicts an example of delimiting line detection processing according to the exemplary embodiment.
FIG. 4 illustrates an example of a determination table according to the exemplary embodiment.

That is, the delimiting line detection unit 23 detects, as the delimiting line candidate Lc, a pair of edge lines corresponding to left and right ends of each delimiting line L in a width direction. FIG. 3 depicts an example of delimiting line detection processing according to the exemplary embodiment. As shown in FIG. 3, when an edge line Le1 and ab edge line Le2 are substantially parallel with each other and a distance d between the edge line Le1 and the edge line Le2 belongs to a predetermined range, the delimiting line detection unit 23 detects the delimiting line candidate Lc from the edge line Le1 and the edge line Le2.

For example, a case in which the delimiting line is a white line is described. In this case, since the luminance difference increases at a boundary between the white line and the road surface, the two edge lines substantially parallel with each other can be easily extracted. For this reason, the delimiting line detection unit 23 detects, as the delimiting line candidate Lc, the pair of the edge line Le1 and the edge line Le2 substantially parallel with each other and arranged with a predetermined interval.

Here, the predetermined range is a range corresponding to a line width of the delimiting line, and is, for example, a range of 5 cm to 10 cm. Also, as shown in FIG. 3, the delimiting line detection unit 23 detects, as the delimiting line candidate Lc, an area in which the edge line Le1 and the edge line Le2 are overlapped, and the distance d is a width of the delimiting line candidate Lc.

In other words, the delimiting line detection unit 23 does not detect, as the delimiting line candidate Lc, an area in which the edge line Le1 and the edge line Le2 are not overlapped. As described above, the reason is that a delimiting line is configured by a pair of edge lines corresponding to left and right ends of the delimiting line in the width direction.

That is, a noise is also assumed for the area in which the edge line Le1 and the edge line Le2 are not overlapped. For this reason, the delimiting line detection unit 23 does not detect, as the delimiting line candidate Lc, an area in which the edge line Le1 and the edge line Le2 are not overlapped, thereby detecting only the delimiting line candidate Lc with high accuracy. Thereby, it may be possible to suppress false detection of the parking space PS.

Returning to FIG. 2, the delimiting line detection unit 23 is configured to register the information about the delimiting line candidates Lc detected as described above in the delimiting line information 31 of the storage 3. For example, when the delimiting line candidate Lc is detected, the delimiting line detection unit 23 registers vertex coordinates of four corners of the detected delimiting line candidate Lc in the delimiting line information 31.

In the meantime, the delimiting line detection unit 23 may execute the detection processing of the delimiting line candidate Lc, except the improper area detected by the improper area determination unit 22. In other words, the delimiting line detection unit 23 does not execute the detection processing of the delimiting line candidate Lc for the improper area. Thereby, it may be possible to suppress a processing load of the control unit 2.

The exclusion determination unit 24 is configured to determine whether there is a parking-unavailable area in which the parking of the vehicle C is not permitted, based on the delimiting line candidates Lc detected by the delimiting line detection unit 23 and registered in the delimiting line information 31. For example, the exclusion determination unit 24 determines whether there is a parking-unavailable area such as a stripe area, as the parking-unavailable area.

Specifically, when the delimiting line candidates Lc substantially parallel with each other are assumed as support delimiting lines and a plurality of parallel lines inclined to the support delimiting lines exists with a predetermined interval, the exclusion determination unit 24 regards an area between the support delimiting lines, as a stripe area. The exclusion determination unit 24 determines the stripe area, as the parking-unavailable area.

Also, the exclusion determination unit 24 may detect each road surface marker included in the image data by matching the delimiting line candidate Lc detected by the delimiting line detection unit 23 and a template model of each road surface marker.

Also, the exclusion determination unit 24 may determine whether there is the delimiting line candidate Lc, which is not necessary to detect the parking space PS, such as a road surface marker. For example, when the plurality of delimiting line candidates Lc is detected within the predetermined range R1 of the image data, the exclusion determination unit 24 determines whether or not to exclude the plurality of delimiting line candidates Lc from the candidates of the delimiting line L by comparing the edge strength of the plurality of delimiting line candidates Lc. The exclusion determination processing will be described in detail later.

When the unnecessary delimiting line candidate Lc is determined, the exclusion determination unit 24 excludes the corresponding delimiting line candidate Lc from the delimiting line information 31. Also, the exclusion determination unit 24 applies the information about the parking-unavailable area to the delimiting line information 31, and notifies the same to the parking space detection unit 25.

The parking space detection unit 25 is configured to detect the parking spaces PS, based on the delimiting line candidates Lc detected by the delimiting line detection unit 23. Specifically, the parking space detection unit 25 detects, as the parking space PS, an area between the pair of delimiting line candidates Lc arranged in parallel with each other with a predetermined interval.

Here, the predetermined interval is a width of a standard parking area for general public defined by laws and the like relating to the parking lot. Also, in this case, the parking space detection unit 25 may detect the parking space PS while avoiding the area determined as the parking-unavailable area by the exclusion determination unit 24.

That is, the parking space detection unit 25 may detect the parking space PS while avoiding the stripe area and the like determined as the parking-unavailable area. When the parking space detection unit 25 detects the parking space PS, it notifies parking space information about the parking space PS to the parking space managing unit 26.

In the below, the delimiting line candidate Lc used for detection as the parking space PS by the parking space detection unit 25 is referred to as 'delimiting line L'. Also, the parking space information includes the vertex coordinates of each parking space PS based on the vehicle C (i.e., the vertex coordinates of a side of the delimiting line L in contact with the parking space PS).

The parking space managing unit 26 is configured to manage the parking spaces PS detected by the parking space detection unit 25 in chronical order. The parking space managing unit 26 may estimate a moving amount of the vehicle C on the basis of the sensor values input from the sensor group Sc, and estimate the vertex coordinates of each actual parking space PS based on past parking space information, based on the moving amount.

Also, the parking space managing unit 26 may update coordinate information of the parking space PS in the past parking space information, based on the newly input parking space information. That is, the parking space managing unit 26 is configured to frequently update a relative positional relationship of the vehicle C and the parking space PS, in association with movement of the vehicle C.

Also, the parking space managing unit 26 may set a detection range of the parking space PS while assuming that a plurality of parking spaces PS is continuously arranged. For example, the parking space managing unit 26 sets one parking space PS detected by the parking space detection unit 25, as a reference, and assumes that there is a plurality of parking spaces PS continuously to the parking space PS.

The parking space managing unit 26 is configured to set positions of the assumed parking spaces PS, as a detection range. Thereby, since the line segment extraction unit 21 has only to execute the detection processing of the edge line only within the detection range set by the parking space managing unit 26, it may be possible to suppress the processing load of the control unit 2.

The stop position determination unit 27 is configured to determine a stop position upon parking of the vehicle C in the parking space PS, based on the edge lines detected by the line segment extraction unit 21. For example, the stop position determination unit 27 determines a stop position of the vehicle C by detecting a wheel block, a curbstone, a wall, a white line extending in a vehicle width direction and the like, based on the edge lines detected by the line segment extraction unit 21.

When a wheel block is detected, the stop position determination unit 27 determines a stop position so that rear wheels of the vehicle C are to be located just before the wheel block. When a white line, a wall and the like are detected, instead of the wheel block, the stop position determination unit 27 determines a stop position so that a rear end (for example, a tip end of a rear bumper) of the vehicle C is to be located just before the white line.

The storage 3 corresponds to a RAM and an HDD, for example. The RAM and the HDD can store therein a variety of information and information of diverse programs. In the meantime, the image processing device 1 may be configured to acquire the programs and diverse information through another computer connected with a wired or wireless network, or a portable recording medium.

In the delimiting line information 31, the information about the delimiting line candidates Lc detected by the delimiting line detection unit 23 is registered. For example, in the delimiting line information 31, the vertex coordinates of four corners of the detected delimiting line candidate Lc are registered.

The determination table 32 is a table that is used when the exclusion determination unit 24 executes the exclusion processing of the delimiting line candidate Lc. FIG. 4 depicts an example of the determination table 32 according to the exemplary embodiment. As described above, when the plurality of delimiting line candidates Lc is detected within the predetermined range R1 (refer to FIG. 1B), the plurality of delimiting line candidates Lc is classified into "attention delimiting line candidate" and "adjacent delimiting line candidate". Here, the attention delimiting line candidate is one delimiting line candidate Lc that is to be noticed by the exclusion determination unit 24, and the adjacent delimiting line candidate is a delimiting line candidate Lc except the attention delimiting line candidate. In the meantime, the adjacent delimiting line candidate is not limited to the delimiting line candidate Lc adjacent to the attention delimiting line candidate, and may be any delimiting line candidate Lc inasmuch as it is a delimiting line candidate Lc except the attention delimiting line candidate detected within the predetermined range R1.

As shown in FIG. 4, the exclusion determination unit 24 is configured to determine whether or not to exclude the attention delimiting line candidate and the adjacent delimiting line candidate from the delimiting line candidates Lc, based on the edge strength of the attention delimiting line candidate and the adjacent delimiting line candidate.

Specifically, when the attention delimiting line candidate has "strong edge strength" and the adjacent delimiting line candidate has "strong edge strength", the exclusion determination unit 24 keeps the attention delimiting line candidate and the adjacent delimiting line candidate, as the delimiting line candidates Lc.

Also, when the attention delimiting line candidate has "weaker edge strength" and the adjacent delimiting line candidate has "stronger edge strength", the exclusion determination unit 24 excludes the attention delimiting line candidate from the delimiting line candidates Lc.

Also, when the attention delimiting line candidate has "stronger edge strength" and the adjacent delimiting line candidate has "weaker edge strength", the exclusion determination unit 24 excludes the adjacent delimiting line candidate from the delimiting line candidates Lc.

Also, when the attention delimiting line candidate has "weak edge strength" and the adjacent delimiting line candidate has "weak edge strength", the exclusion determination unit 24 keeps the attention delimiting line candidate and the adjacent delimiting line candidate, as the delimiting line candidates Lc.

In the meantime, the case in which one delimiting line candidate Lc has the stronger edge strength and the other delimiting line candidate Lc has the weaker edge strength indicates a case in which a difference of the edge strength of one delimiting line candidate Lc and the other delimiting line candidate Lc is equal to or greater than the predetermined value.

<Details of Image Processing>

Subsequently, the image processing according to the exemplary embodiment is described in detail with reference to FIGS. 5 to 10. FIGS. 5 to 10 illustrate details of the image processing method according to the exemplary embodiment. In the meantime, FIGS. 5 to 10 depict a case in which the delimiting line L (refer to FIG. 1B) is a substantially U-shaped line.

Figure 5:
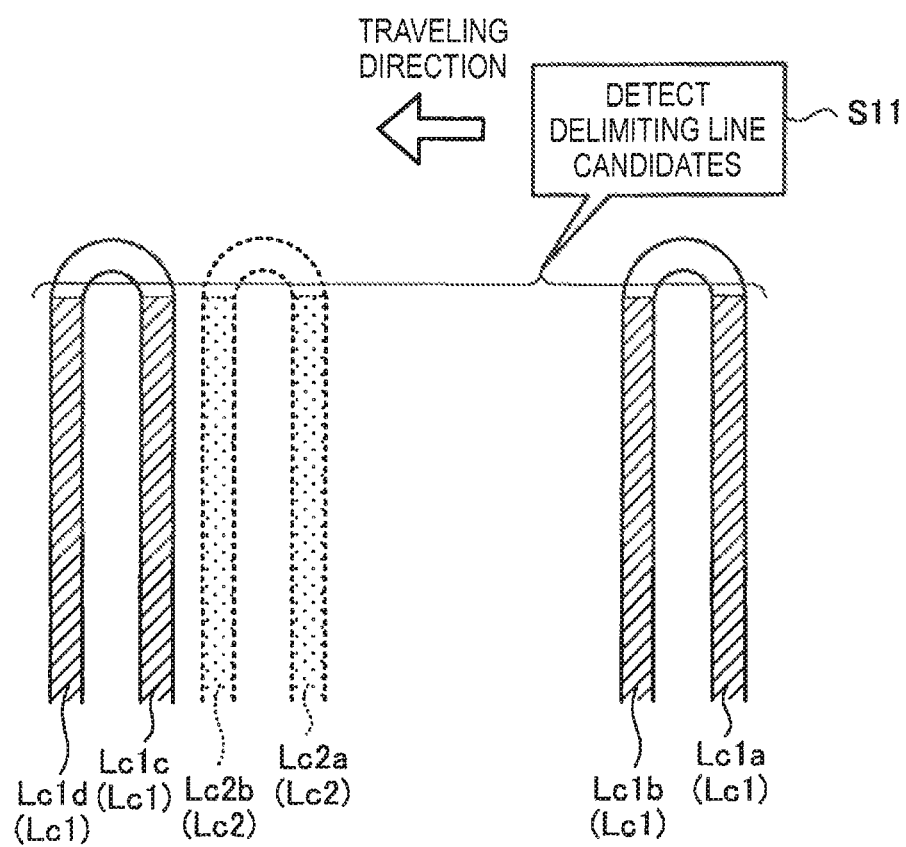
FIG. 5 illustrates details of the image processing method according to the exemplary embodiment.

As shown in FIG. 5, the delimiting line detection unit 23 first detects the delimiting line candidates Lc from the captured data (step S11). In the example of FIG. 5, as the delimiting line candidate Lc1 based on the actual delimiting line L, delimiting line candidates Lc1a to Lc1d are detected in corresponding order from a traveling direction of the vehicle C (refer to FIG. 1A). In the meantime, the delimiting line candidate Lc1a is adjacent to the delimiting line candidate Lc1b, and the delimiting line candidate Lc1c is adjacent to the delimiting line candidate Lc1d.

Also, as the delimiting line candidate Lc2 based on the unnecessary delimiting line L, which has been forgotten to erase, delimiting line candidates Lc2a, Lc2b are detected in corresponding order from the traveling direction of the vehicle C between the delimiting line candidate Lc1b and the delimiting line candidate Lc1c. In the meantime, the delimiting line candidate Lc2b is adjacent to the delimiting line candidates Lc2a and Lc1c.

Figure 6:
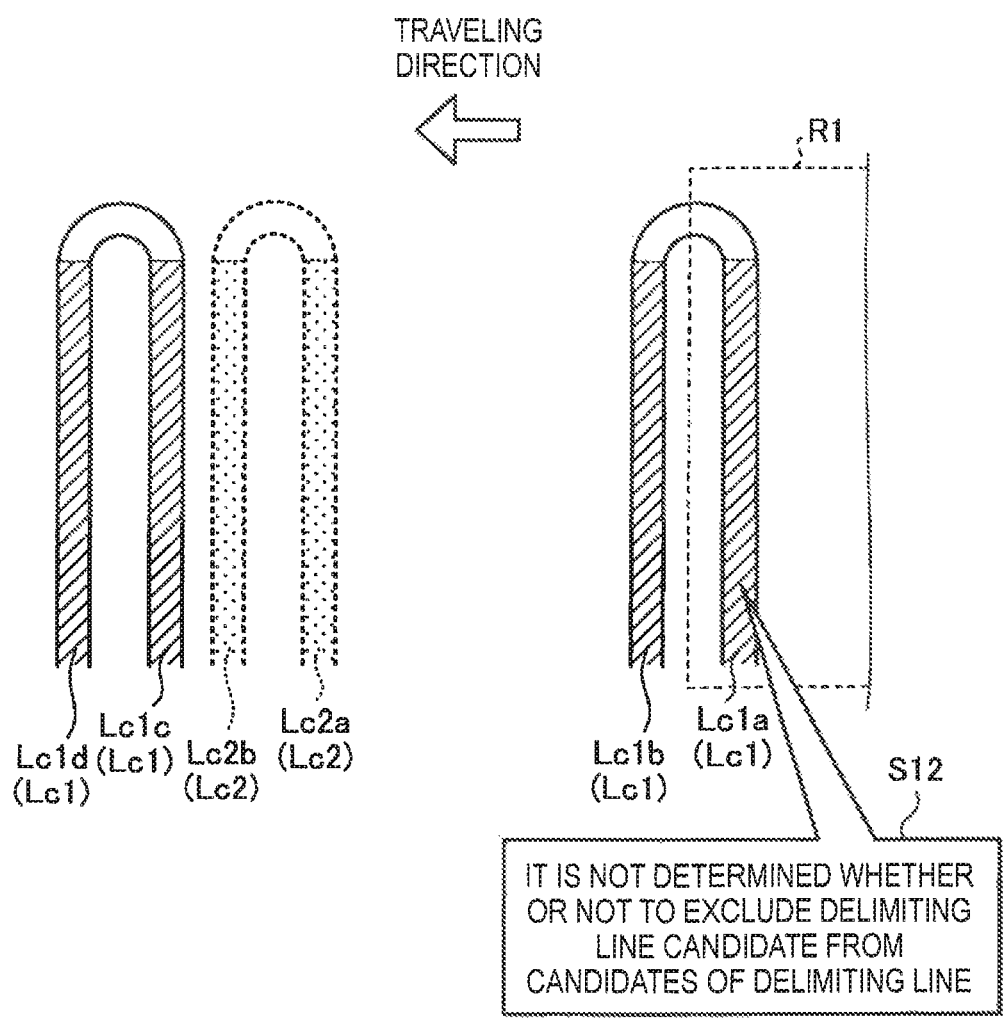
FIG. 6 illustrates details of the image processing method according to the exemplary embodiment.

Then, as shown in FIG. 6, the exclusion determination unit 24 executes the exclusion processing of the delimiting line candidate Lc by scanning the predetermined range R1 within the captured data in the traveling direction. In the example of FIG. 6, only the delimiting line candidate Lc1a located in the foreground in the traveling direction is included within the predetermined range R1.

Here, since the plurality of delimiting line candidates Lc is not included within the predetermined range R1, the exclusion determination unit 24 does not determine whether or not to exclude the delimiting line candidate Lc1a within the predetermined range R1 from the candidates of the delimiting line L (step S12).

Like this, in the exemplary embodiment, when the plurality of delimiting line candidates Lc is not included within the predetermined range R1, it is not determined whether or not to exclude the delimiting line candidate Lc within the predetermined range R1 from the candidates of the delimiting line L. Thereby, the delimiting line candidate Lc based on the actual delimiting line L can be suppressed from being falsely excluded from the candidates of the delimiting line L.

Figure 7:
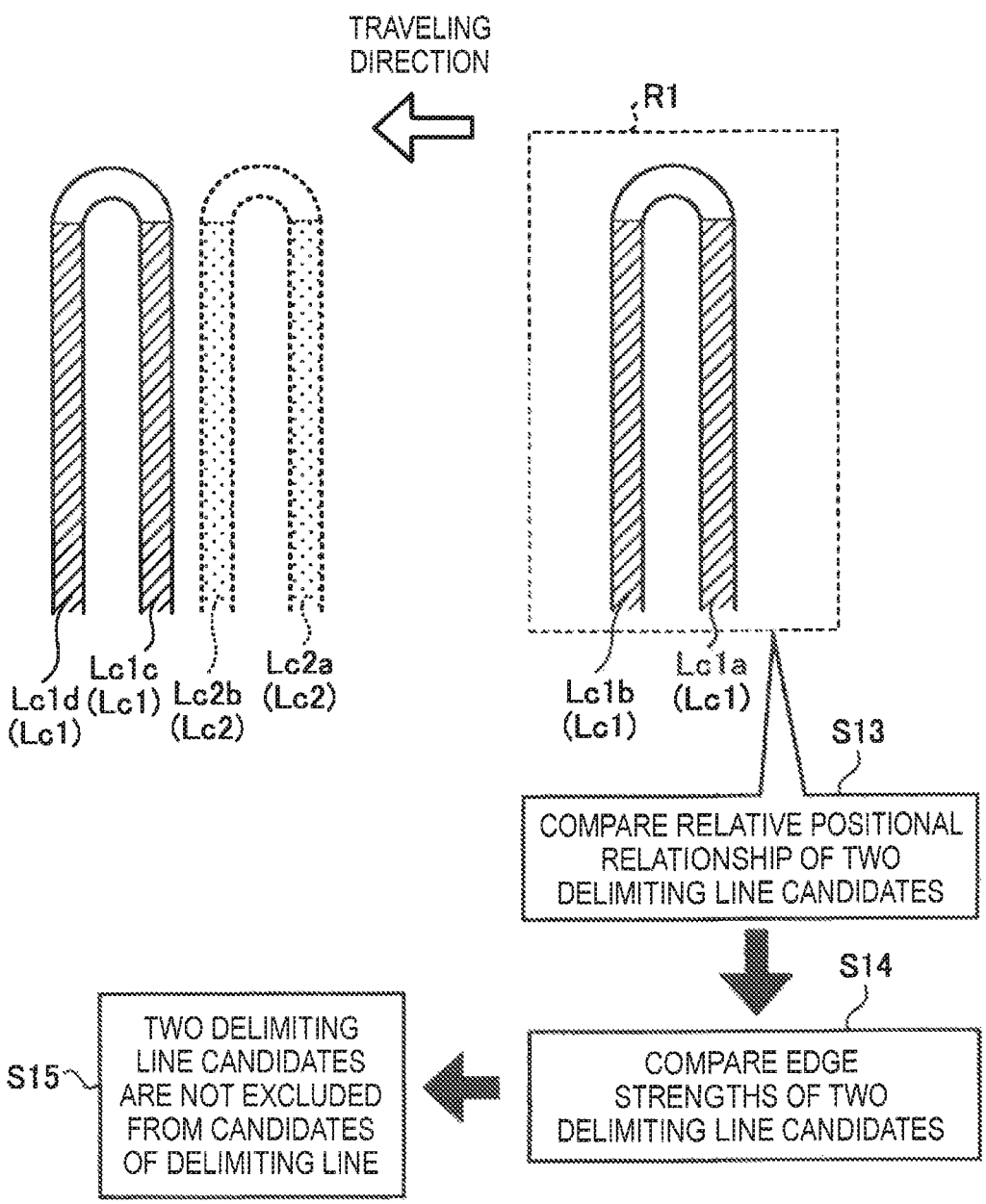
FIG. 7 illustrates details of the image processing method according to the exemplary embodiment.

Then, as shown in FIG. 7, the predetermined range R1 is scanned in the traveling direction, so that the two delimiting line candidates Lc1a and Lc1b are included within the predetermined range R1. In this case, the exclusion determination unit 24 regards the delimiting line candidate Lc1b newly included within the predetermined range R1, as the attention delimiting line candidate, and regards the other delimiting line candidate Lc1a, as the adjacent delimiting line candidate, for example.

Then, the exclusion determination unit 24 compares a relative positional relationship of the two delimiting line candidates Lc1a and Lc1b included within the predetermined range R1 (step S13). Specifically, the exclusion determination unit 24 determines whether the two delimiting line candidates Lc1a and Lc1b are arranged substantially in parallel with each other.

In the example of FIG. 7, since the two delimiting line candidates Lc1a and Lc1b are arranged substantially in parallel with each other, the exclusion determination unit 24 compares the edge strength of the two delimiting line candidates Lc1a and Lc1b (step S14).

Here, since both the two delimiting line candidates Lc1a and Lc1b have the strong edge strength and a difference of the edge strength is smaller than the predetermined value, the exclusion determination unit 24 does not exclude both the delimiting line candidates Lc1a and Lc1b from the candidates of the delimiting line L (step S15).

In other words, since both the delimiting line candidate Lc1b, which is the attention delimiting line candidate, and the delimiting line candidate Lc1a, which is the adjacent delimiting line candidate, have the strong edge strength, the exclusion determination unit 24 keeps both the delimiting line candidates Lc1a and Lc1b as the delimiting line candidate Lc, based on the determination table 32.

On the other hand, when it is determined in step S13 that the delimiting line candidates Lc1a and Lc1b are not arranged substantially in parallel with each other, the exclusion determination unit 24 does not determine whether or not to exclude the delimiting line candidate Lc1b, which is the attention delimiting line candidate, from the candidates of the delimiting line L.

Also, in this case, since the delimiting line candidate Lc, which is a determination target within the predetermined range R1, is only the delimiting line candidate Lc1a, it is not also determined whether or not to exclude the delimiting line candidate Lc1a from the candidates of the delimiting line L.

Like this, in the exemplary embodiment, the relative positional relationship of the plurality of delimiting line candidates Lc included within the predetermined range R1 is compared and only the plurality of delimiting line candidates Lc arranged substantially in parallel with each other is set as the determination target of the exclusion processing. That is, if the unnecessary delimiting line L is erased and a new delimiting line L is again drawn, the new delimiting line L is again drawn substantially in parallel with the unnecessary delimiting line L, in many cases.

Like this, in the exemplary embodiment, it is determined whether or not to exclude the delimiting line candidates Lc from the candidates of the delimiting line L, based on the relative positional relationship of the plurality of delimiting line candidates Lc included within the predetermined range R1. Thereby, it may be possible to narrow the target of the exclusion determination, so that it may be possible to suppress the processing load of the exclusion determination unit 24.

Also, in the exemplary embodiment, only the plurality of delimiting line candidates Lc arranged substantially in parallel with each other is set as the determination target of the exclusion processing, so that it may be possible to set, as the determination target, only the unnecessary delimiting line L arranged substantially in parallel with the new delimiting line L drawn again.

Figure 8:
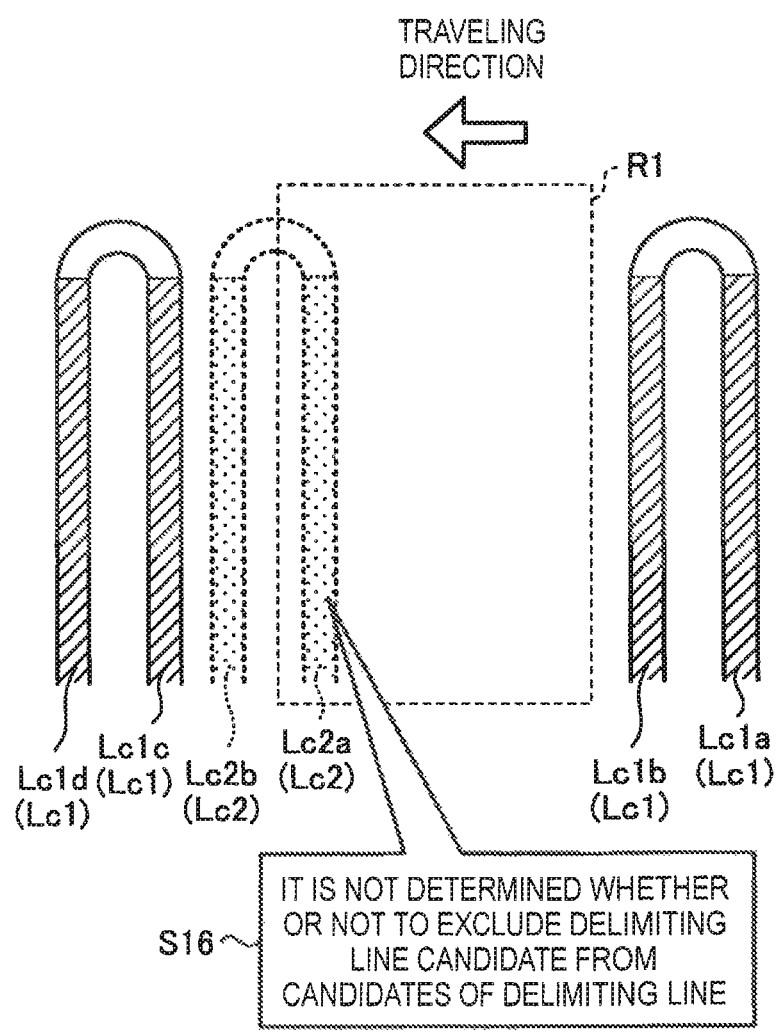
FIG. 8 illustrates details of the image processing method according to the exemplary embodiment.

Then, as shown in FIG. 8, the predetermined range R1 is scanned in the traveling direction, so that one delimiting line candidate Lc2a is included within the predetermined range R1. In this case, since the plurality of delimiting line candidates Lc is not included within the predetermined range R1, the exclusion determination unit 24 does not determine whether or not to exclude the delimiting line candidate Lc2a within the predetermined range R1 from the candidates of the delimiting line L, like step S12 (step S16).

Figure 9:
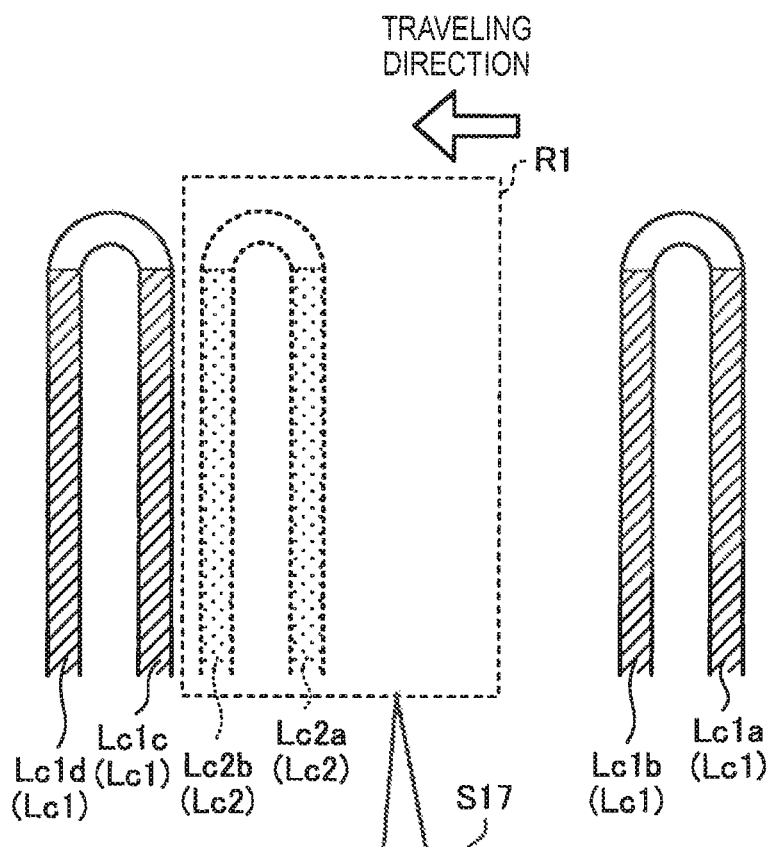
FIG. 9 illustrates details of the image processing method according to the exemplary embodiment.

Then, as shown in FIG. 9, the predetermined range R1 is scanned in the traveling direction, so that the two delimiting line candidates Lc2a and Lc2b are included within the predetermined range R1. In this case, the exclusion determination unit 24 regards the delimiting line candidate Lc2b, which is newly included within the predetermined range R1, as the attention delimiting line candidate, and regards the other delimiting line candidate Lc2a, as the adjacent delimiting line candidate, for example.

Then, the exclusion determination unit 24 compares a relative positional relationship of the two delimiting line candidates Lc2a and Lc2b included within the predetermined range R1 (step S17). Specifically, the exclusion determination unit 24 determines whether the two delimiting line candidates Lc2a and Lc2b are arranged substantially in parallel with each other.

In the example of FIG. 9, since the two delimiting line candidates Lc2a and Lc2b are arranged substantially in parallel with each other, the exclusion determination unit 24 compares the edge strength of the two delimiting line candidates Lc2a and Lc2b (step S18). Here, since both the two delimiting line candidates Lc2a and Lc2b have the weak edge strength and a difference of the edge strength is smaller than the predetermined value, the exclusion determination unit 24 does not exclude both the delimiting line candidates Lc2a and Lc2b from the candidates of the delimiting line L (step S19).

In other words, since both the delimiting line candidate Lc2b, which is the attention delimiting line candidate, and the delimiting line candidate Lc2a, which is the adjacent delimiting line candidate, have the weak edge strength, the exclusion determination unit 24 keeps both the delimiting line candidates Lc2a and Lc2b as the delimiting line candidates Lc, based on the determination table 32.

Like this, the plurality of delimiting line candidates Lc, which have the weak edge strength, is not excluded from the candidates of the delimiting line L, so that it may be possible to prevent the delimiting line candidates Lc based on the actual delimiting line L of which edge strength is weakened due to aging degradation and the like from being falsely excluded from the candidates of the delimiting line L.

Figure 10:
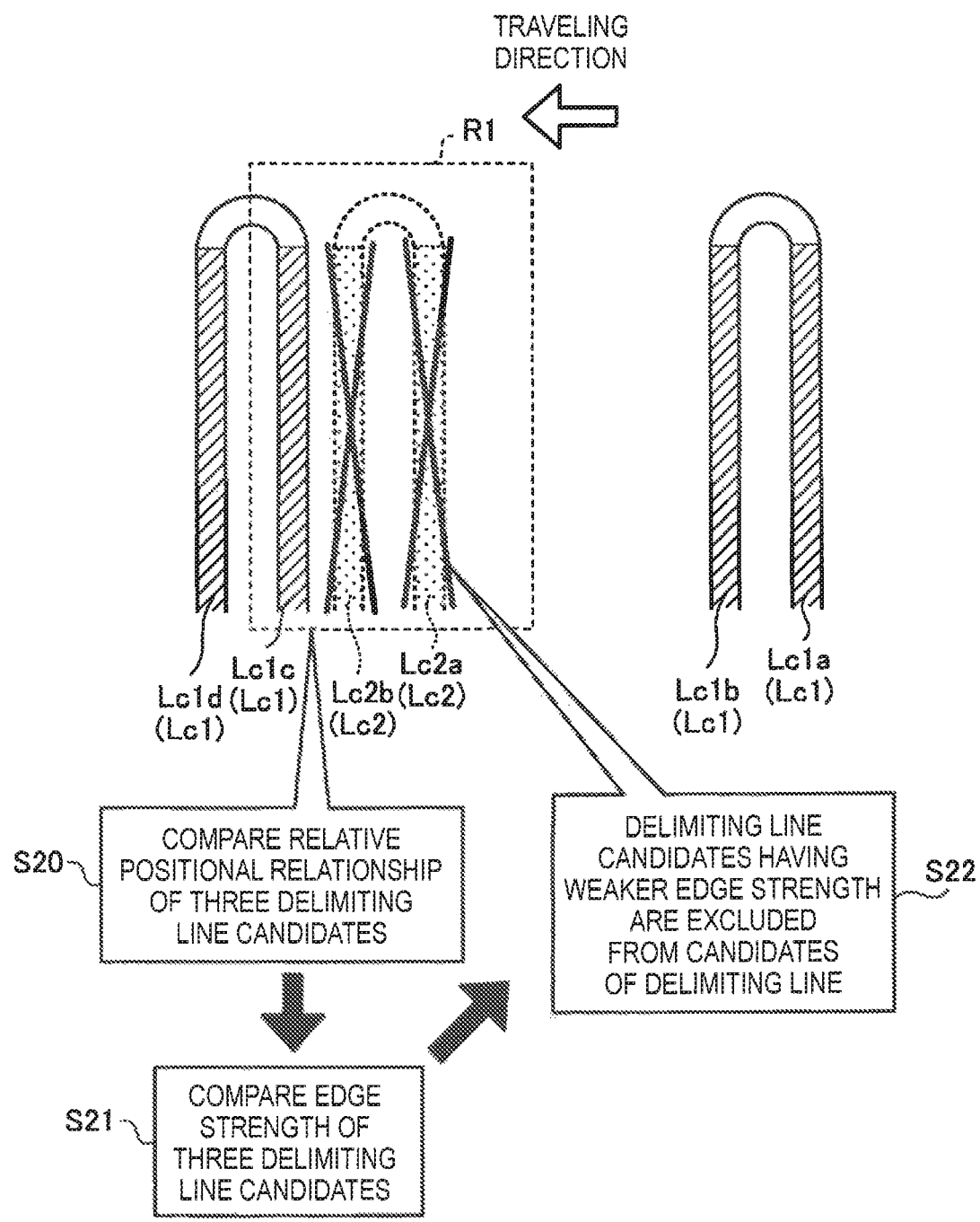
FIG. 10 illustrates details of the image processing method according to the exemplary embodiment.

Then, as shown in FIG. 10, the predetermined range R1 is scanned in the traveling direction, so that the three delimiting line candidates Lc2a, Lc2b and Lc1c are included within the predetermined range R1. In this case, the exclusion determination unit 24 regards the delimiting line candidate Lc1c, which is newly included within the predetermined range R1, as the attention delimiting line candidate, and regards the other delimiting line candidates Lc2a and Lc2b, as the adjacent delimiting line candidate, for example.

Then, the exclusion determination unit 24 compares a relative positional relationship of the three delimiting line candidates Lc2a, Lc2b and Lc1c included within the predetermined range R1 (step S20). Specifically, the exclusion determination unit 24 determines whether the three delimiting line candidates Lc2a, Lc2b and Lc1c are arranged substantially in parallel with each other.

In the example of FIG. 10, since the three delimiting line candidates Lc2a, Lc2b and Lc1c are arranged substantially in parallel with each other, the exclusion determination unit 24 compares the edge strength of the three delimiting line candidates Lc2a, Lc2b and Lc1c (step S21).

Here, since the delimiting line candidates Lc2a and Lc2b have the edge strength weaker than the delimiting line candidate Lc1c and a difference of the edge strength is greater than the predetermined value, the exclusion determination unit 24 determines the delimiting line candidates Lc2a and Lc2b of which edge strength is weaker, as the unnecessary delimiting lines forgotten to erase, and excludes the same from the candidates of the delimiting line L (step S22).

That is, the delimiting line candidate Lc1c, which is the attention delimiting line candidate, has the stronger edge strength and the delimiting line candidates Lc2a and Lc2b, which are the adjacent delimiting line candidates, have the weaker edge strength. For this reason, the exclusion determination unit 24 excludes the delimiting line candidates Lc2a and Lc2b, which are the adjacent delimiting line candidates, from the candidates of the delimiting line L, based on the determination table 32.

Thereby, the exclusion determination unit 24 can exclude the delimiting line candidates Lc2a and Lc2b based on the unnecessary delimiting line L, which has been forgotten to erase, from the candidates of the delimiting line L. Therefore, according to the exemplary embodiment, it may be possible to improve the detection accuracy of the delimiting line L.

Also, in the exemplary embodiment, when the difference of the edge strength of the plurality of delimiting line candidates Lc is smaller than the predetermined value, the plurality of delimiting line candidates Lc is all kept as the delimiting line candidates Lc. Only when the difference of the edge strength of the plurality of delimiting line candidates Lc is greater than the predetermined value, the exclusion determination of the plurality of delimiting line candidates Lc is executed. Thereby, it may be possible to prevent the delimiting line candidate Lc based on the actual delimiting line L of which edge strength is weakened due to aging degradation and the like from being falsely excluded from the candidates of the delimiting line L.

Meanwhile, in the exemplary embodiment, the delimiting line candidate Lc, which is newly included within the predetermined range R1, is regarded as the attention delimiting line candidate, and the other delimiting line candidate Lc is regarded as the adjacent delimiting line candidate. However, the exemplary embodiment is not limited thereto. For example, the delimiting line candidate Lc first detected may be regarded as the attention delimiting line candidate, and the other delimiting line candidate Lc may be regarded as the adjacent delimiting line candidate.

Also, in the exemplary embodiment, only the plurality of delimiting line candidates Lc arranged substantially in parallel with each other is set as the determination target of the exclusion processing. However, the plurality of delimiting line candidates Lc not arranged substantially in parallel with each other may be set as the determination target of the exclusion processing.

Also, in the exemplary embodiment, it is determined whether or not to exclude the delimiting line candidate Lc from the candidates of the delimiting line L, based on the determination table 32. However, the exemplary embodiment is not limited thereto.

For example, the exclusion determination unit 24 aligns the edge strength of the plurality of delimiting line candidates Lc detected in one parking lot in the weaker order, and sets the edge strength of the delimiting line candidate Lc of which order is the middle (for example, when one hundred delimiting line candidates Lc are detected, fiftieth edge strength from a side on which the edge strength is weak), as a threshold value for determination.

Then, the exclusion determination unit 24 may exclude the delimiting line candidate Lc having the edge strength weaker than the threshold value for determination from the candidates of the delimiting line L, and keep the delimiting line candidate Lc having the edge strength equal to or greater than the threshold value for determination, as the candidate of the delimiting line L.

In this way, the edge strength of the delimiting line candidate Lc of which order is the middle is set as the threshold value for determination, so that even when the delimiting line candidate Lc, which has the edge strength between the weak edge strength and the strong edge strength and has been forgotten to erase, is detected, it may be possible to exclude the delimiting line candidate Lc having such intermediate edge strength from the candidates of the delimiting line L.

<Sequence of Image Processing>

Figure 11:
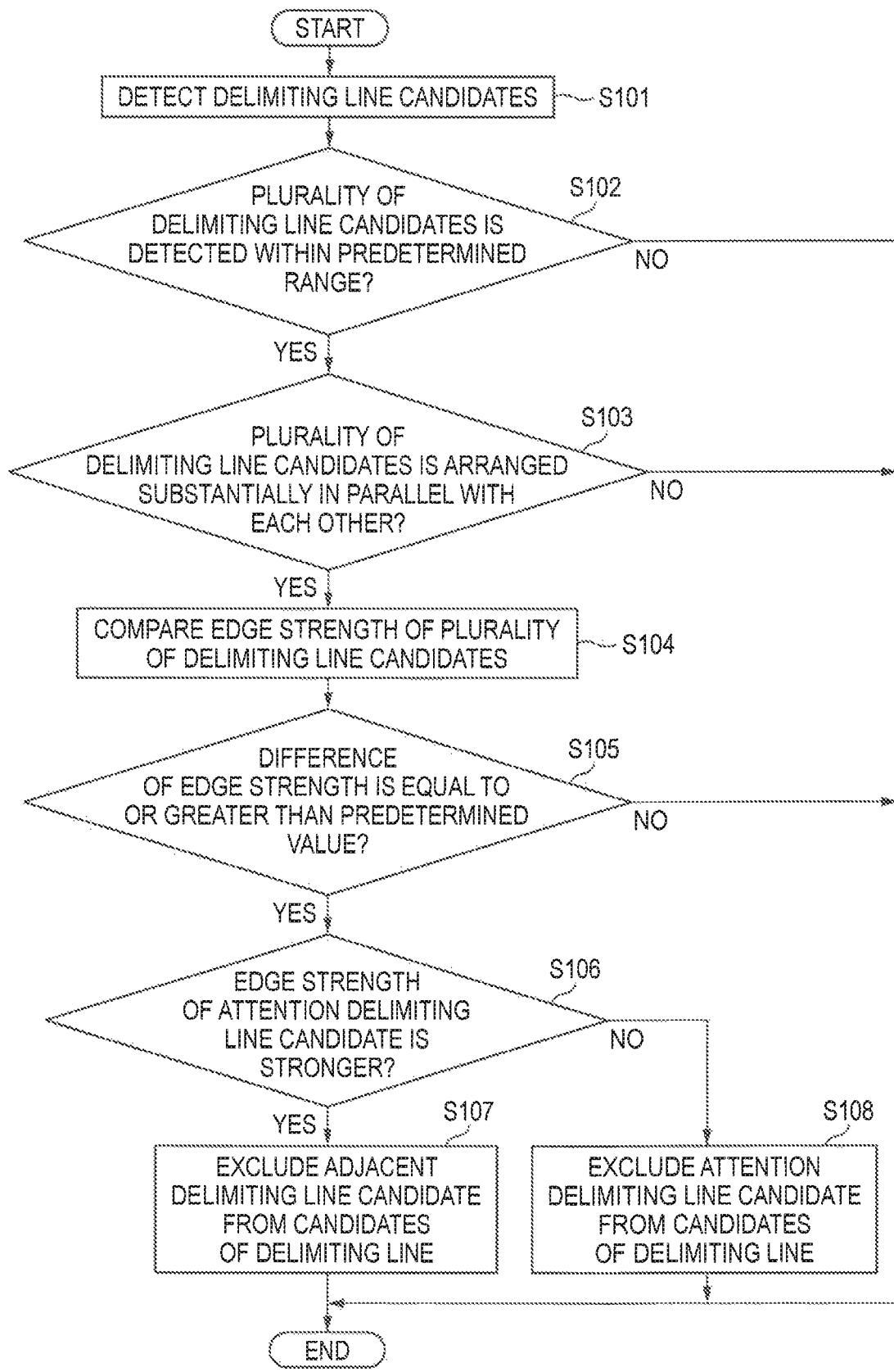
FIG. 11 is a flowchart depicting a sequence of the image processing method according to the exemplary embodiment.

Subsequently, a sequence of the image processing according to the exemplary embodiment is described with reference to FIG. 11. FIG. 11 is a flowchart depicting a sequence of the image processing according to the exemplary embodiment.

First, the delimiting line detection unit 23 detects the delimiting line candidates Lc from the captured data (step S101). Then, the exclusion determination unit 24 determines whether a plurality of delimiting line candidates Lc is detected within the predetermined range R1 of the image data (step S102).

Then, when it is determined that the plurality of delimiting line candidates Lc is detected within the predetermined range R1 (step S102, Yes), the exclusion determination unit 24 determines whether the plurality of delimiting line candidates Lc is arranged substantially in parallel with each other (step S103).

When it is determined that the plurality of delimiting line candidates Lc is arranged substantially in parallel with each other (step S103, Yes), the exclusion determination unit 24 compares the edge strength of the plurality of delimiting line candidates Lc (step S104). When it is determined that the plurality of delimiting line candidates Lc is not detected within the predetermined range R1 (step S102, No), the processing ends. Also, when it is determined that the plurality of delimiting line candidates Lc is not arranged substantially in parallel with each other (step S103, No), the processing ends.

Then, the exclusion determination unit 24 determines whether a difference of the edge strength of the plurality of delimiting line candidates Lc detected in step S104 is equal to or greater than the predetermined value (step S105).

When it is determined that the difference of the edge strength of the plurality of delimiting line candidates Lc is equal to or greater than the predetermined value (step S105, Yes), the exclusion determination unit 24 determines whether the edge strength of the attention delimiting line candidate is stronger than the edge strength of the adjacent delimiting line candidate (step S106).

When it is determined that the edge strength of the attention delimiting line candidate is stronger than the edge strength of the adjacent delimiting line candidate (step S106, Yes), the adjacent delimiting line candidate having the weak edge strength is excluded from the candidates of the delimiting line L (step S107), and the processing ends.

On the other hand, when it is determined that the edge strength of the attention delimiting line candidate is weaker than the edge strength of the adjacent delimiting line candidate (step S106, No), the attention delimiting line candidate having the weak edge strength is excluded from the candidates of the delimiting line L (step S108), and the processing ends.

On the other hand, when it is determined in step S105 that the difference of the edge strength of the plurality of delimiting line candidates Lc is not equal to or greater than the predetermined value (step S105, No), the processing ends.

Although the exemplary embodiment of the present disclosure has been described, the present disclosure is not limited to the exemplary embodiment, and a variety of changes can be made without departing from the gist of the present disclosure. For example, in the exemplary embodiment, the delimiting line L is a single line or a substantially U-shaped line. However, the shape of the delimiting line L is not limited thereto.

The image processing device 1 according to the exemplary embodiment includes the delimiting line detection unit 23 and the exclusion determination unit 24. The delimiting line detection unit 23 is configured to detect the delimiting line candidate Lc, which is a candidate of the delimiting line L for delimiting the parking space PS, based on the image data obtained by capturing the surrounding of the vehicle C. The exclusion determination unit 24 is configured to determine whether or not to exclude the delimiting line candidate Lc detected by the delimiting line detection unit 23 from the candidates of the delimiting line L. Also, when the plurality of delimiting line candidates Lc is detected within the predetermined range R1 of the image data, the exclusion determination unit 24 determines whether or not to exclude the delimiting line candidates Lc from the candidates of the delimiting line L by comparing the edge strength of the plurality of delimiting line candidates Lc. Thereby, it may be possible to improve the detection accuracy of the delimiting line L.

Also, in the image processing device 1 according to the exemplary embodiment, when the difference of the edge strength of the plurality of delimiting line candidates Lc is equal to or greater than the predetermined value, the exclusion determination unit 24 excludes the delimiting line candidate Lc2 having the weaker edge strength from the candidates of the delimiting line L. Thereby, it may be possible to exclude the delimiting line candidate Lc2 based on the unnecessary delimiting line L, which has been forgotten to erase, from the delimiting line candidates Lc.

Also, in the image processing device 1 according to the exemplary embodiment, the exclusion determination unit 24 is configured to determine whether or not to exclude the delimiting line candidates Lc from the candidates of the delimiting line L, based on the relative positional relationship of the plurality of delimiting line candidates Lc. Thereby, it may be possible to set, as the determination target of the exclusion processing, only the plurality of delimiting line candidates Lc arranged substantially in parallel with each other.

Also, in the image processing device 1 according to the exemplary embodiment, when the plurality of delimiting line candidates Lc is arranged substantially in parallel with each other, the exclusion determination unit 24 determines whether or not to exclude the delimiting line candidates Lc from the candidates of the delimiting line L. Thereby, it may be possible to suppress the processing load of the exclusion determination unit 24.

Also, the image processing method according to the exemplary embodiment includes the delimiting line detection process (step S101) and the exclusion determination process (steps S102 to S108). In the delimiting line detection process (step S101), the delimiting line candidate Lc, which is the candidate of the delimiting line L for delimiting the parking space PS, is detected based on the image data obtained by capturing the surrounding of the vehicle C. In the exclusion determination process (steps S102 to S108), it is determined whether or not to exclude the delimiting line candidate Lc detected by the delimiting line detection process (step S101) from the candidates of the delimiting line L. Also, when the plurality of delimiting line candidates Lc is detected within the predetermined range R1 of the image data, in the exclusion determination process (steps S102 to S108), the edge strengths of the plurality of delimiting line candidates Lc are compared (step S104), so that it is determined whether or not to exclude the delimiting line candidates Lc from the candidates of the delimiting line L. Thereby, it may be possible to improve the detection accuracy of the delimiting line L.

The additional effects and modified embodiments can be easily deduced by one skilled in the art. For this reason, the wider aspect of the present disclosure is not limited to the specific details and exemplary embodiments as described above. Therefore, a variety of changes can be made without departing from the spirit and scope of the concept of the general invention defined by the claims and equivalents thereof.

What is claimed is:

1. An image processing device comprising:
a computer including a hardware processor configured to function as a delimiting line detection unit and an exclusion determination unit, wherein
the delimiting line detection unit is configured to detect a delimiting line candidate based on image data obtained by capturing a surrounding of a vehicle, the delimiting line candidate being a candidate of a delimiting line that delimits a parking space; and
the exclusion determination unit is configured to determine whether or not to exclude the delimiting line candidate detected by the delimiting line detection unit from being the candidate of the delimiting line,
wherein, in a case where a plurality of the delimiting line candidates are detected within a predetermined range in the image data and in a case where the plurality of delimiting line candidates are arranged substantially in parallel with each other, the exclusion determination unit determines whether or not to exclude the delimiting line candidate from being the candidate of the delimiting line by comparing edge strengths of the plurality of delimiting line candidates to each other.

2. The image processing device according to claim 1, wherein, in a case where a difference between the edge strengths of the plurality of delimiting line candidates is equal to or greater than a predetermined value, the exclusion determination unit excludes the delimiting line candidate having a weaker edge strength among the plurality of delimiting line candidates, from being the candidate of the delimiting line.

3. The image processing device according to claim 1, wherein the exclusion determination unit is configured to determine whether or not to exclude the delimiting line candidate from being the candidate of the delimiting line, based on a relative positional relationship of the plurality of delimiting line candidates.

4. The image processing device according to claim 2, wherein the exclusion determination unit is configured to determine whether or not to exclude the delimiting line candidate from being the candidate of the delimiting line, based on a relative positional relationship of the plurality of delimiting line candidates.

5. An image processing method comprising:
detecting, by a computer including a hardware processor, a delimiting line candidate based on image data obtained by capturing a surrounding of a vehicle, the delimiting line candidate being a candidate of a delimiting line that delimits a parking space; and
determining, by the computer including the hardware processor, whether or not to exclude the delimiting line candidate detected, from being the candidate of the delimiting line,
wherein, in a case where a plurality of the delimiting line candidates are detected within a predetermined range in the image data and in a case where the plurality of delimiting line candidates are arranged substantially in parallel with each other, it is determined whether or not to exclude the delimiting line candidate from being the candidate of the delimiting line by comparing edge strengths of the plurality of delimiting line candidates to each other.

6. The image processing device according to claim 1, wherein
the delimiting line candidate detected by the delimiting line detection unit is an edge line formed by connecting adjacent edge points, each of the adjacent edge points having a pixel with an edge strength that exceeds a predetermined value.

7. The image processing method according to claim 5, wherein the delimiting line candidate detected is an edge line formed by connecting adjacent edge points, each of the adjacent edge points having a pixel with an edge strength that exceeds a predetermined value.

8. The image processing device according to claim 1, wherein the delimiting line detection unit detects, as the delimiting line candidate, a rectangular area having edge lines that are substantially parallel with each other and spaced from each other by a predetermined range corresponding to a width of a delimiting line.

9. The image processing method according to claim 5, wherein the delimiting line candidate is detected as a rectangular area having edge lines that are substantially parallel with each other and spaced from each other by a predetermined range corresponding to a width of a delimiting line.

* * * * *